United States Patent
Manghirmalani et al.

(10) Patent No.: US 9,130,869 B2
(45) Date of Patent: Sep. 8, 2015

(54) METHODS OF REDIRECTING NETWORK FORWARDING ELEMENTS AND RELATED FORWARDING ELEMENTS AND CONTROLLERS

(75) Inventors: Ravi Manghirmalani, San Jose, CA (US); Ramesh Subrahmaniam, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 823 days.

(21) Appl. No.: 13/369,993

(22) Filed: Feb. 9, 2012

(65) Prior Publication Data

US 2013/0208621 A1    Aug. 15, 2013

(51) Int. Cl.
*H04L 12/28* (2006.01)
*H04L 12/721* (2013.01)
*H04L 12/54* (2013.01)

(52) U.S. Cl.
CPC ............... *H04L 45/44* (2013.01); *H04L 12/28* (2013.01); *H04L 12/56* (2013.01)

(58) Field of Classification Search
CPC .......... H04L 12/28; H04L 12/56; H04L 45/44
USPC ........................................................ 370/254
See application file for complete search history.

(56) References Cited

U.S. PATENT DOCUMENTS

2005/0021840 A1* 1/2005 Niemi ........................... 709/238
2014/0348068 A1* 11/2014 Morper et al. .............. 370/328

OTHER PUBLICATIONS

McKeown N. et al., "OpenFlow: Enabling Innovation in Campus Networks", SIGCOMM CCR, vol. 38, Issue 2, Mar. 14, 2008, 6 pages.
OpenFlow Switch Specification, version 1.1.0 Implemented (Wire Protocol 0x02), Feb. 28, 2011, pp. 1-56.
Kim J. et al. "OpenFlow Tutorial & Demonstration", Networked Computing Systems Lab., School of Information and Communications, GIST, May 23, 2011, pp. 1-39.
Baldonado O., "OpenFlow a Short Tutorial", Big Switch Networks, presentation slides from Interop 2011 at Mandalay Bay Convention Center, Las Vegas, NV, May 8-12, 2011, pp. 1-27.
"OpenFlow", Wikipedia, http://en.wikipedia.org/wiki/OpenFlow_Switching_Protocol, retrieved on Nov. 30, 2011.

* cited by examiner

*Primary Examiner* — Sai-Ming Chan

(57) ABSTRACT

A method of connecting a network forwarding element may include transmitting a first connection request from the forwarding element to a first network controller. After transmitting the first connection request, a rejection message may be received from the first network controller at the network forwarding element, with the rejection message being responsive to the first connection request and with the rejection message including an address of a second network controller. Responsive to receiving the rejection message, a second connection request may be transmitted from the network forwarding element to the second network controller. Related forwarding elements and controllers are also discussed.

22 Claims, 5 Drawing Sheets

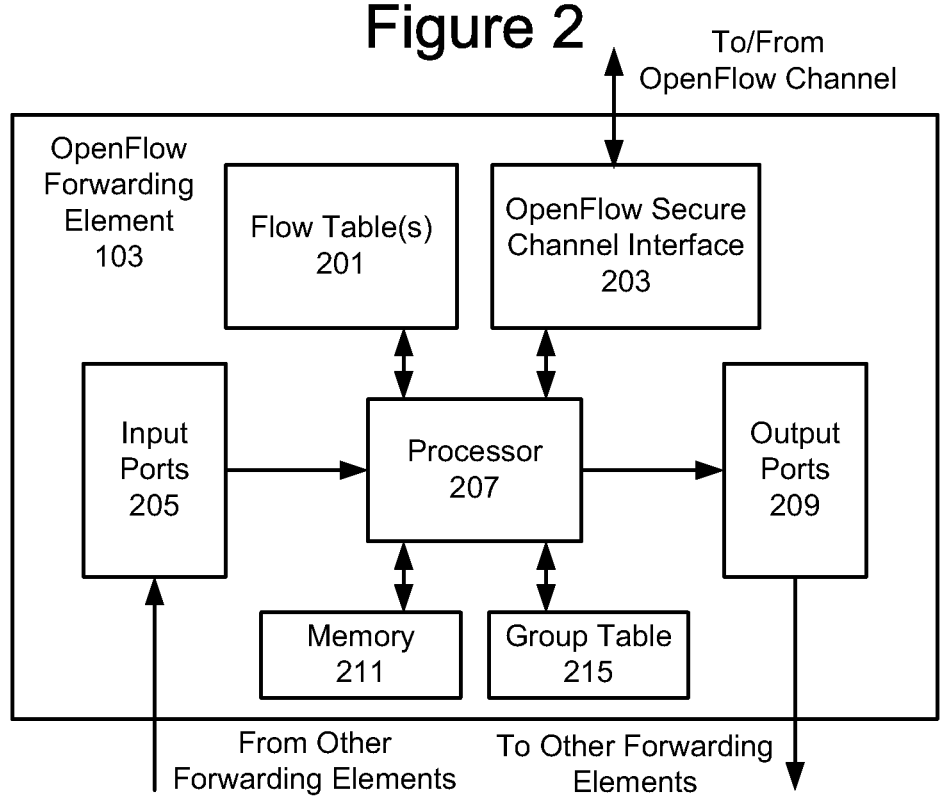
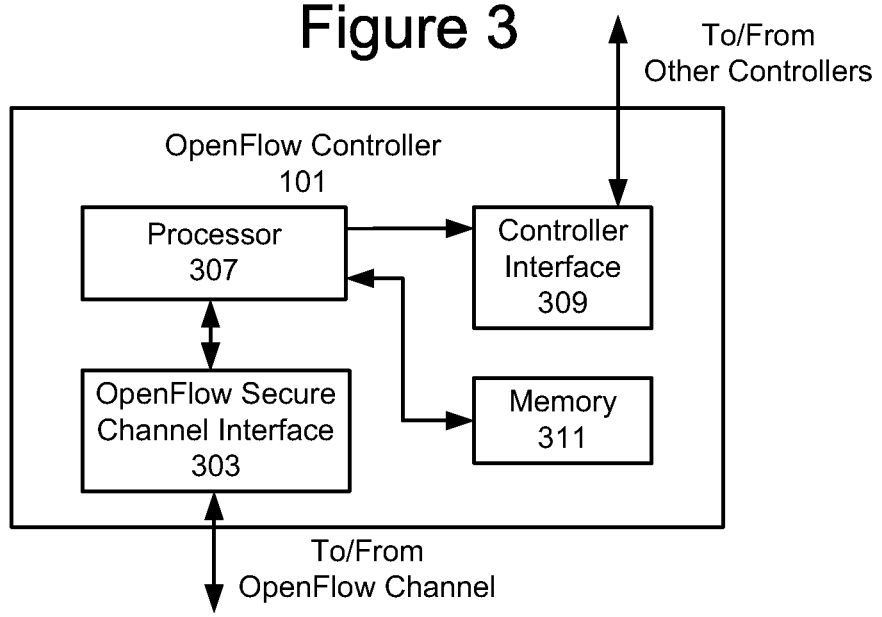

METHODS OF REDIRECTING NETWORK FORWARDING ELEMENTS AND RELATED FORWARDING ELEMENTS AND CONTROLLERS

TECHNICAL FIELD

The present disclosure is directed to communications and, more particularly, to network communications and related methods, network forwarding elements, and network controllers.

BACKGROUND

Most modern Ethernet forwarding elements (e.g., switches and routers) include flow-tables (typically built from TCAMs or Ternary Content Addressable Memories) that run at line-rate to implement firewalls, NAT (network address translation), and QoS (quality of service), and to collect statistics. While flow-tables of different vendors may be different, OpenFlow exploits a common set of functions that run in many switches and routers.

OpenFlow provides an open protocol to program flowtables in different forwarding elements (e.g., switches and routers). A network administrator, for example, can partition traffic into production and research flows, and/or researchers can control their own flows by choosing the routes their packets follow and the processing they receive. In this way, researchers can try new routing protocols, security models, addressing schemes, and even alternatives to IP (Internet Protocol). On the same network, the production traffic may be isolated and processed conventionally.

The datapath of an OpenFlow forwarding element (e.g., switch) may include a flow table, and an action associated with each flow entry included in the flow table. The set of actions supported by an OpenFlow forwarding element may be extensible. For high-performance and low-cost, the datapath may have a carefully prescribed degree of flexibility, which may mean forgoing the ability to specify arbitrary handling of each packet and seeking a more limited, but still useful, range of actions.

An OpenFlow forwarding element may include a flow table having a plurality of flow entries (with an action associated with each flow entry) to tell the forwarding element how to process the respective flow, a secure channel that connects the switch to a remote OpenFlow controller (allowing commands and packets to be sent between the controller and the forwarding element using the OpenFlow Protocol (which provides an open and standard way for a controller to communicate with a forwarding element). By specifying a standard interface (the OpenFlow Protocol) through which entries in the forwarding element Flow Table can be defined using an external controller, researchers may not need to individually program OpenFlow forwarding elements.

An OpenFlow forwarding element may include one or more flow tables and a group table (which may perform packet lookups and forwarding) and an OpenFlow channel to an external OpenFlow controller. The OpenFlow controller manages the forwarding element via the OpenFlow protocol. Using this protocol, the controller can add, update, and delete flow entries, both reactively (in response to packets received at the forwarding element) and proactively (e.g., to program flow tables of a new forwarding element).

Each flow table in the forwarding element may include a set of flow entries. Each flow entry may include matched fields, counters, and a set of instructions to apply to matching packets.

Matching at a forwarding element may start at a first flow table and may continue to additional flow tables of the forwarding element. Flow entries match data packets in priority order, with the first matching entry in each table being used. If a matching entry is found for a data packet in a flow table, the instructions associated with the specific flow entry are executed for the data packet. If no match is found for the data packet in a flow table, the outcome may depend on forwarding element configuration. The data packet may be forwarded to the controller over the OpenFlow channel, the data packet may be dropped, or attempts to match the data packet may continue to a next flow table of the forwarding element.

Instructions associated with each flow entry describe data packet forwarding, data packet modification, group table processing, and pipeline processing. Pipeline processing instructions allow data packets to be sent to subsequent tables for further processing and allow information (e.g., in the form of metadata) to be communicated between tables. Table pipeline processing may stop when the instruction set associated with a matching flow entry does not specify a next table. At this point, the data packet may usually be modified and forwarded.

Flow entries may forward respective data packets to a port. This is usually a physical port, but it may also be a virtual port defined by the switch or a reserved virtual port defined by the OpenFlow switch specification. Reserved virtual ports may specify generic forwarding actions such as sending to the controller, flooding, or forwarding using non-OpenFlow methods, such as "normal" switch processing, while switch-defined virtual ports may specify link aggregation groups, tunnels or loopback interfaces.

Flow entries may also point to a group, which specifies additional processing. Groups represent sets of actions for flooding, as well as more complex forwarding semantics (e.g., multipath, fast reroute, and link aggregation). As a general layer of indirection, groups also enable multiple flows to forward to a single identifier (e.g., IP forwarding to a common next hop). This abstraction may allow common output actions across flows to be changed efficiently.

A group table may include group entries, with each group entry including a list of action buckets with specific semantics dependent on group type. The actions in one or more action buckets are applied to data packets sent to the group.

OpenFlow forwarding elements (e.g., switches and/or routers), controllers, and protocols are discussed, for example, in "OpenFlow Switch Specification," Version 1.1.0 Implemented (Wire Protocol 0x02), Feb. 28, 2011, and in the reference by McKeown et al. entitled "OpenFlow: Enabling Innovation In Campus Networks," Mar. 14, 2008. The disclosures of both of the above referenced documents are hereby incorporated herein in their entireties by reference.

The OpenFlow channel is an interface that connects an OpenFlow forwarding element with a controller over an OpenFlow interface. The interface itself may be implementation specific, and it may be implemented using a TCP (Transmission Control Protocol) connection or a SCTP (Stream Control Transmission Protocol) connection. Moreover, TLS (Transport Layer Security) may be used to send messages that are encrypted by the controller and decrypted by the forwarding element.

Control for a network of OpenFlow forwarding elements may be implemented using a cluster of OpenFlow controllers, and each forwarding element may use a known IP (Internet Protocol) address of one of the controllers to connect with the addressed controller according to a configuration protocol. In some implementations, a non-standard configuration channel may be used to configure a connection between a forwarding element and a respective controller. In other implementations, a forwarding element may be programmed with a list of IP addresses for controllers to connect with, and the forwarding element may sequentially attempt to connect to a controller using each controller address in the list until a successful connection with a controller is made.

Conventionally, a connection between an OpenFlow forwarding element and an OpenFlow controller may be set up responsive to the forwarding element initiating a connection socket with the controller and requesting the connection. The controller may then decide whether to allow the connection or not. If the controller accepts the connection, the connection may be completed and messages between the controller and the forwarding element may be transmitted over the resulting OpenFlow channel. If the controller does not accept the connection, the connection socket may be terminated.

Conventionally, once a connection is established between an OpenFlow forwarding element and an OpenFlow controller, the OpenFlow controller may only be able to drop the connection by ignoring an ECHO-REQUEST communication from the forwarding element (i.e., by not transmitting an ECHO-REPLY in response to the ECHO-REQUEST) thereby allowing the connection to timeout. Dropping a connection in this manner, however, may be dependent on a timeout value configuration of the OpenFlow Request-Reply protocol. Stated in other words, once the controller decides to drop a connection with a forwarding element, the connection may not actually be dropped until after a next ECHO-REQUEST has been transmitted by the forwarding element and a timeout period has passed after the ECHO-REQUEST without transmitting an ECHO-REPLY.

Moreover, conventional mechanisms to connect an OpenFlow forwarding element with an OpenFlow switch may be limited. A complex configuration channel may be adopted, for example, to configure an OpenFlow forwarding element to connect with a controller from a list of controllers known to the forwarding element. Using such a known list of controllers, however, may make it difficult for a forwarding element to connect to an unknown controller (e.g., a controller added to the cluster after provisioning the list). In addition, it may be difficult to share the load of network forwarding elements in the forwarding plane among controllers in the control plane.

In some controller implementations, one controller of a cluster of controllers may be designated as a master controller of the cluster, and only the master controller may be allowed to accept OpenFlow connections from network forwarding elements. If another controller is later designated among the controllers as the master controller or if the master controller fails in a conventional arrangement, the forwarding element may be delayed in connecting to a new master controller and/or the forwarding element may be unable to connect to the new master element.

Accordingly, there continues to exist a need in the art for improved operations in networks including forwarding elements and controllers.

SUMMARY

It is therefore an object to address at least some of the above mentioned disadvantages and/or to improve network performance.

According to some embodiments, a method of connecting a network forwarding element may include transmitting a first connection request from the forwarding element to a first network controller. After transmitting the first connection request, a rejection message may be received from the first network controller at the network forwarding element, with the rejection message being responsive to the first connection request and with the rejection message including an address of a second network controller. Responsive to receiving the rejection message, a second connection request may be transmitted from the network forwarding element to the second network controller.

By allowing a controller to redirect a forwarding element to another controller, a forwarding element may be efficiently connected to a desired controller even through the desired controller is not known to the forwarding element at the time of the connection request. Such redirection may thus facilitate connection of a new forwarding element to an appropriate controller in a network, connection of a forwarding element to a new master controller after loss of a previous master controller, and/or distribution of forwarding element loads across a plurality of peer controllers.

The rejection message may include the address of the second network controller and an address of a third network controller. Moreover, the first and second network controllers may be respective first and second OpenFlow network controllers, the network forwarding element may be an OpenFlow network forwarding element, and the rejection message may be transmitted over an OpenFlow channel.

The network forwarding element may include a flow table having a plurality of flow entries with each of the plurality of flow entries defining processing for data packets of a respective data stream. In addition, an acceptance message may be received from the second network controller at the network forwarding element after transmitting the second connection request, and an instruction to change at least one of the plurality of flow entries may be received from the second network controller at the network forwarding element after receiving the acceptance message. Moreover, the at least one of the plurality of flow entries may be changed responsive to the instruction received from the second network controller. After changing the at least one of the plurality of flow entries, a data packet of a data stream may be processed through the network forwarding element in accordance with the at least one of the plurality of flow entries including the change.

The rejection message may include the address of the second network controller and an address of a third network controller, and a third connection request may be transmitted from the network forwarding element to the third network controller responsive to transmitting the second connection request without establishing a connection with the second network controller.

The network forwarding element may include a flow table having a plurality of flow entries with each of the plurality of flow entries defining processing for data packets of a respective data stream. After transmitting the third connection request, an acceptance message may be received from the third network controller at the network forwarding element. After receiving the acceptance message, an instruction to change at least one of the plurality of flow entries may be received from the third network controller at the network forwarding element. Moreover, the at least one of the plurality of flow entries may be changed responsive to the instruction received from the third network controller.

According to some other embodiments, a method of redirecting a network forwarding element may include receiving a connection request at a first network controller from the network forwarding element. Responsive to receiving the connection request, the controller may determine whether to accept control of the forwarding element at the first network controller. Responsive to determining to not accept control of the forwarding element at the first network controller, a rejection message may be transmitted from the first network controller to the network forwarding element, with the rejection message including an address of a second network controller.

The rejection message may include the address of the second network controller and an address of a third network controller. Moreover, the first and second network controllers may be respective first and second OpenFlow network controllers, the network forwarding element may be an OpenFlow network forwarding element, and the rejection message may be transmitted over an OpenFlow channel.

The network forwarding element may include a flow table having a plurality of flow entries with each of the plurality of flow entries defining processing for data packets of a respective data stream. Responsive to determining to accept control of the forwarding element at the first network controller, an acceptance message may be transmitted from the first network controller to the network forwarding element. After transmitting the acceptance message, an instruction to change at least one of the plurality of flow entries may be transmitted from the first network controller to the network forwarding element.

According to still other embodiments, a network forwarding element may include a channel interface configured to provide communications between the network forwarding element in a forwarding plane and a control plane including a plurality of controllers, and a processor coupled to the channel interface. The processor may be configured to transmit a first connection request through the channel interface to a first network controller of the control plane, to receive a rejection message from the first network controller through the channel interface after transmitting the first connection request. The rejection message may be responsive to the first connection request and the rejection message may include an address of a second network controller of the control plane. In addition, the processor may be configured to transmit a second connection request from the network forwarding element to the second network controller responsive to receiving the rejection message.

The rejection message may include the address of the second network controller and an address of a third network controller. The first and second network controllers may be respective first and second OpenFlow network controllers, the network forwarding element may be an OpenFlow network forwarding element, the channel interface may be an OpenFlow secure channel interface, and the rejection message may be transmitted over an OpenFlow channel.

The network forwarding element may further include a plurality of input ports configured to receive data packets of data streams from other forwarding elements, and a plurality of output ports configured to transmit the data packets of the data streams to other forwarding elements, with the processor being coupled between the input and output ports. A flow table may be coupled to the processor, with the flow table including a plurality of flow entries with each of the plurality of flow entries defining processing for data packets of a respective data stream between respective ones of the input and output ports, between a respective one of the input ports and the control plane, and/or between the control plane and a respective one of the output ports. Moreover, the processor may be further configured to receive an acceptance message from the second network controller through the channel interface after transmitting the second connection request, to receive an instruction to change at least one of the plurality of flow entries from the second network controller through the channel interface after receiving the acceptance message, and to change the at least one of the plurality of flow entries of the flow table responsive to the instruction received from the second network controller.

The processor may be further configured to process a data packet of a data stream between respective ones of the input and output ports, between respective ones of the input ports and the control plane, and/or between the control plane and respective ones of the output ports in accordance with the at least one of the plurality of flow entries including the change.

The rejection message may include the address of the second network controller and an address of a third network controller, with the processor being further configured to transmit a third connection request through the channel interface to the third network controller responsive to transmitting the second connection request without establishing a connection with the second network controller.

The forwarding element may further include a plurality of input ports configured to receive data packets of data streams from other forwarding elements and a plurality of output ports configured to transmit the data packets of the data streams to other forwarding elements, with the processor being coupled between the input and output ports. In addition, a flow table may be coupled to the processor, with the flow table including a plurality of flow entries with each of the plurality of flow entries defining processing for data packets of a respective data stream between respective ones of the input and output ports, between a respective one of the input ports and the control plane, and/or between the control plane and a respective one of the output ports. The processor may be further configured to receive an acceptance message from the third network controller through the channel interface after transmitting the third connection request, to receive an instruction to change at least one of the plurality of flow entries from the third network controller through the channel interface after receiving the acceptance message, and to change the at least one of the plurality of flow entries responsive to the instruction received from the third network controller.

According to yet further embodiments, a network controller may include a channel interface configured to provide communications between the network controller in a control plane and a forwarding plane including a plurality of network forwarding element, and a processor coupled to the channel interface. The processor may be configured to receive a connection request through the channel interface from the network forwarding element, to determine whether to accept control of the forwarding element at the first network controller responsive to receiving the connection request, and to transmit a rejection message through the channel interface to the network forwarding element responsive to determining to not accept control of the forwarding element, with the rejection message including an address of a second network controller.

The rejection message may include the address of the second network controller and an address of a third network controller. The first and second network controllers may be respective first and second OpenFlow network controllers, the network forwarding element may be an OpenFlow network forwarding element, the channel interface may be an OpenFlow secure channel interface, and the rejection message may be transmitted over an OpenFlow channel.

The network forwarding element may include a flow table having a plurality of flow entries with each of the plurality of flow entries defining processing for data packets of a respective data stream. Moreover the processor may be further configured to transmit an acceptance message through the channel interface to the network forwarding element responsive to determining to accept control of the forwarding element, and to transmit an instruction to change at least one of the plurality of flow entries through the channel interface to the network forwarding element after transmitting the acceptance message.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 2 is a block diagram illustrating a forwarding element of FIG. 1 according to some embodiments;

FIG. 3 is a block diagram illustrating a controller of FIG. 1 according to some embodiments;

DETAILED DESCRIPTION

Embodiments of the present invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in one or more other embodiments.

According to some embodiments discussed herein, the OpenFlow protocol may be extended to provide redirection of connection between an OpenFlow forwarding element in a network forwarding plane from one OpenFlow controller to another OpenFlow controller in a network control plane. Communications may be provided between the controllers so that each controller may be aware of the existence and/or status of the other controllers in the control plane. Accordingly, any controller in the control plane that receives a connection request from a forwarding element in the forwarding plane may redirect the forwarding element to another controller that may be more appropriate for connection with the forwarding element.

Figure 1:
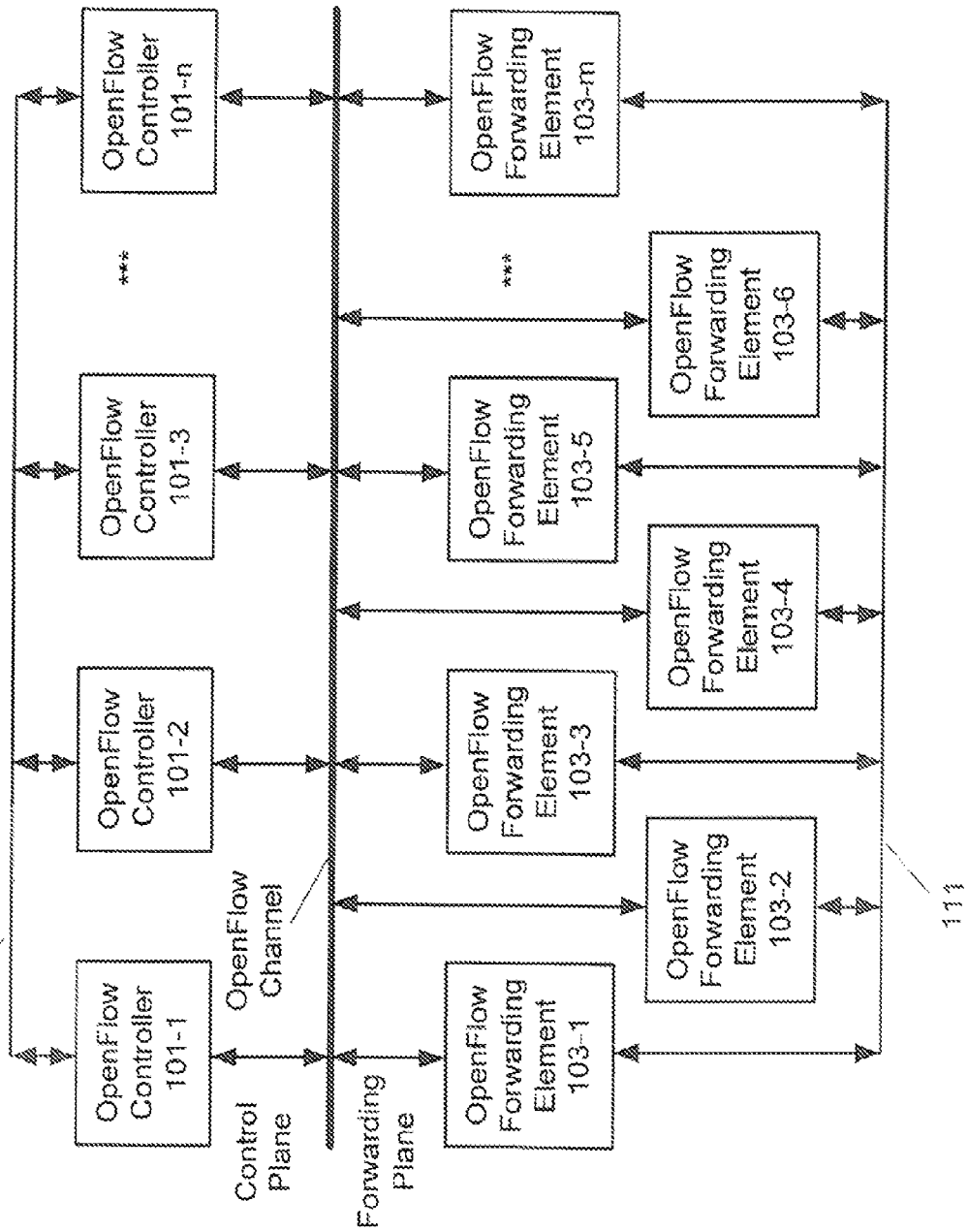
FIG. 1 is a block diagram illustrating a network including controllers and forwarding elements according to some embodiments.

FIG. 1 is a block diagram illustrating a network including a plurality of OpenFlow controllers 101-1 to 101-n (controllers) in a control plane and a plurality of OpenFlow forwarding elements 103-1 to 103-m (forwarding elements) in a forwarding plane, with communications between OpenFlow Controllers 101-1 to 101-n and OpenFlow forwarding elements 103-1 to 103-m being provided though an OpenFlow channel (a channel) therebetween in accordance with an OpenFlow protocol(s). The OpenFlow channel may be implemented, for example, using a Transmission Control Protocol (TCP) connection and/or a Stream Control Transmission Protocol (SCTP) connection, and Transport Layer Security (TLS) may be used to communicate encrypted messages between respective controllers and forwarding elements. Moreover, communication paths 111 (separate from the OpenFlow channel) may be provided between OpenFlow forwarding elements 103-1 to 103-m in the forwarding plane to support transmission of data packets between forwarding elements. In addition, communication paths 115 (separate from the OpenFlow channel) may be provided between controllers 101-1 to 101-n in the control plane to support coordination between controllers.

FIG. 2 is a block diagram illustrating elements of an OpenFlow forwarding element 103 of FIG. 1. As shown, each forwarding element 103 may include a processor 207 coupled between one or more input ports 205 and one or more output ports 209. One or more flow tables 201 may be coupled with processor 207, each flow table may include a plurality of flow entries, and each flow entry may define instructions used to process/forward data packets matching the respective flow entry. Stated in other words, each flow entry may define processing for data packets of a respective data stream(s). Data packets from other forwarding elements may be received at respective input ports 205, processed by processor 207 in accordance with respective flow entries from flow table(s) 201, and transmitted from respective output ports 209 to other forwarding elements.

Each forwarding element 103 may also include memory 211, group tables 215, and OpenFlow Secure Channel Interface 203 (a channel interface). More particularly, OpenFlow secure channel interface 203 may provide communications between processor 207 and a respective OpenFlow controller 101 through the OpenFlow Channel of FIG. 1. OpenFlow secure channel interface 203, for example, may use TLS to encrypt/send messages over the OpenFlow Channel to a respective controller and/or to receive/decrypt messages transmitted by the respective controller over the OpenFlow Channel. In the event that a data packet is received through one of input ports 205 and processor 207 cannot match the data packet with a flow entry in flow table(s) 201, for example, processor 207 may transmit the data packet through OpenFlow Secure Channel Interface 203 over the OpenFlow Channel to a respective controller. In the other direction, processor 207 may receive messages from the respective controller over the OpenFlow Channel through OpenFlow Channel interface 203 to change (e.g., add, update, and/or delete) a flow entry(ies) of flow table(s) 201.

FIG. 3 is a block diagram illustrating elements of an OpenFlow controller 101 of FIG. 1. As shown, each controller 101 may include a processor 307 coupled between OpenFlow Secure Channel Interface 303 (channel interface) and controller interface 309. OpenFlow Secure Channel Interface 303 may provide communications between processor 307 and a respective OpenFlow forwarding element 103 through the OpenFlow Channel of FIG. 1. OpenFlow secure channel interface 303, for example, may use TLS to encrypt/send messages over the OpenFlow Channel to a respective forwarding element(s) and/or to receive/decrypt messages transmitted by the respective forwarding element(s) over the OpenFlow Channel. OpenFlow controller 101 may also include memory 311 coupled to processor 307.

Operations of OpenFlow forwarding element 103 (a forwarding element) and OpenFlow controller 101 (a controller) of FIGS. 1, 2, and 3 will be discussed in greater detail below with respect to the flow charts of FIGS. 4 and 5. Because operations of forwarding element 103 and controller 101 of embodiments discussed herein are interrelated, operations of FIGS. 4 and 5 will be discussed together. Moreover, each forwarding element of FIG. 1 may have a structure as discussed above with respect FIG. 2, and each controller of FIG. 1 may have a structure as discussed above with respect to FIG. 3.

As discussed above, communications between controllers 101-1 to 101-n may be provided through respective controller interfaces 309 of each controller. Accordingly, each controller may maintain in memory 311 thereof a listing of addresses for all of the other controllers of the control plane, and this listing of addresses and/or other network information may be used by each controller to identify one or more other controllers to which forwarding elements may be redirected.

Before forwarding element 103 is coupled into the forwarding plane of the network of FIG. 1, forwarding element 103 memory 211 may be programmed with an address of a controller or a list of addresses of controllers with which it should initiate connection when coupled to the network. The controller address or addresses, for example, may be programmed during manufacturing and/or later using a default controller address or addresses. More particularly, the controller address(es) may be an Internet Protocol (IP) address(es).

When forwarding element 103-1, for example, is initially coupled to the network of FIG. 1, processor 207 may detect that OpenFlow secure channel interface 203 (channel interface) is coupled to the OpenFlow channel. Processor 207 detecting communication with the control plane may serve as a triggering event for processor 207 to initiate connection to a controller of the control plane at block 401 of FIG. 4. While initial connection to the OpenFlow channel is discussed as an example of a triggering event, other events may trigger connection/reconnection at block 401. For example, loss of an existing connection with a controller may trigger connection/reconnection at block 401.

Figure 4:
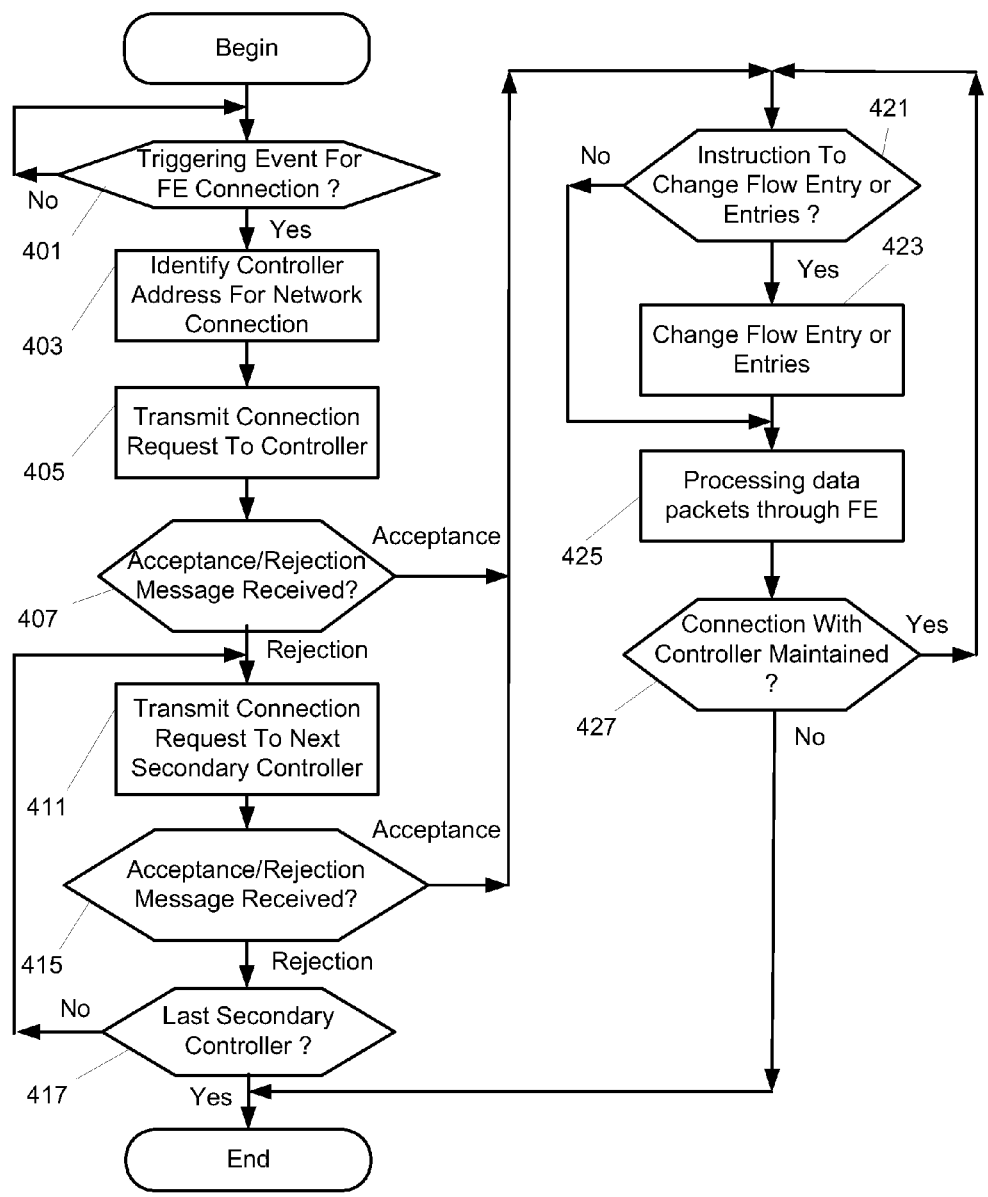
FIG. 4 is a flow chart illustrating operations of a forwarding element according to some embodiments.

In response to the triggering event (e.g., detecting communication with the OpenFlow Channel and/or loss of an existing connection with a controller), processor 207 may identify a controller address (e.g., an IP address of a controller) from memory 211 for network connection at block 403 of FIG. 4. As discussed above, one controller address or a list of controller addresses may be saved in memory 211. The only controller address or the first controller address of a list may be selected by processor 207 for network connection.

At block 405, processor 207 may transmit a connection request using the controller address selected from memory 211. For purposes of this discussion, the controller address may identify controller 101-1 of FIG. 1. For example, processor 207 may initiate a socket connection between channel interface 203 of forwarding element 103-1 and channel interface 303 of controller 101-1 over the OpenFlow channel using the address of controller 101-1 obtained from memory 211, and the connection request may be transmitted to controller 101-1 using the socket connection. If the socket connection cannot be established and a list of controller addresses is programmed in memory 211, processor 207 may attempt to establish a socket connection sequentially using each controller address of the list until a socket connection is established, and the communication request may be transmitted to the controller using the socket connection at block 405.

Figure 5:
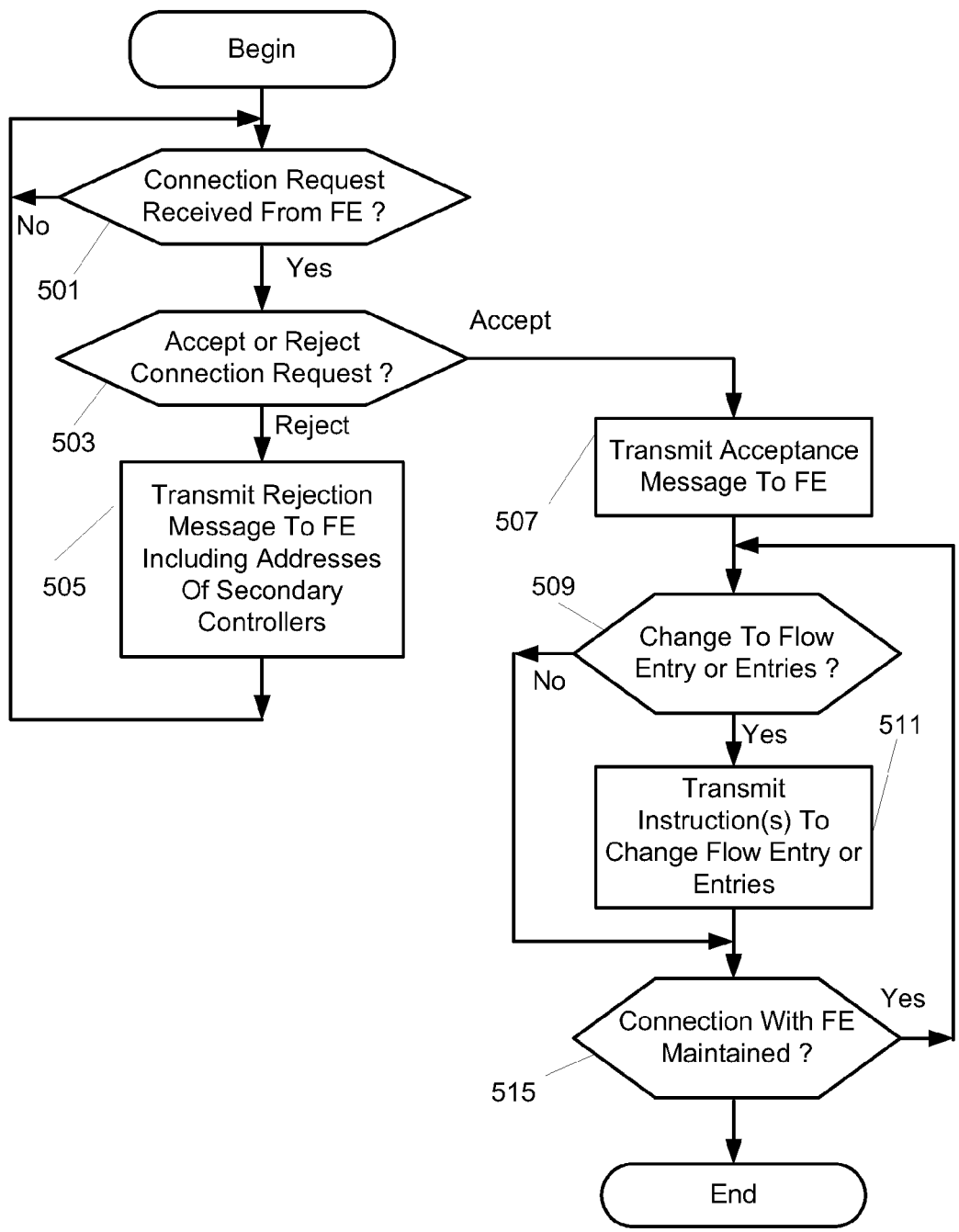
FIG. 5 is flow chart illustrating operations of a controller according to some embodiment.

When the connection request is received at processor 307 of controller 101-1 (through the OpenFlow channel and channel interface 303) at block 501 of FIG. 5, processor 307 (of controller 101-1) may decide at block 503 of FIG. 5 whether to accept or reject the connection request from forwarding element 103-1. If processor 307 accepts the connection request at block 503, processor 307 may transmit an acceptance message at block 507 through channel interface 303 over the OpenFlow channel to forwarding element 103-1. Responsive to receiving the acceptance message over the OpenFlow channel and through channel interface 203 at block 407, processor 207 of forwarding element 103-1 may proceed with operations of blocks 421 to 427 of FIG. 4, and after transmitting the acceptance message, processor 307 of controller 101-1 may proceed with operations 509 to 515 of FIG. 5.

At block 509 of FIG. 5, processor 307 of controller 101-1 may determine if flow entries of flow table(s) 201 of forwarding element 103-1 should be changed (e.g., added, updated, and/or deleted). Processor 307 of controller 101-1 may decide to add one or more new flow entries, update one or more existing flow entries, and/or or delete one or more existing flow entries of flow table(s) 201 of forwarding element 103-1. Such changes may be made proactively (e.g., to initially populate one or more flow tables, to balance loads across multiple forwarding elements, etc.) or reactively (e.g., to accommodate new data streams responsive to unmatched data packets at forwarding element 103-1). If processor 307 decides to change a flow entry at block 509, processor 307 may transmit a change instruction(s) through channel interface 303 over OpenFlow channel to forwarding element 103-1 at block 511. Moreover, operations of blocks 509 and 511 may be repeated as long as the connection between controller 101-1 and forwarding element 103-1 is maintained at block 515.

If processor 207 of forwarding element 103-1 receives such a change instruction(s) from controller 101-1 over OpenFlow channel through channel interface 203 at block 421, processor 207 may change (e.g., add, update, and/or delete) at least one flow entry of its flow table(s) responsive to the change instructions at block 423, and processor 207 may process data packets through forwarding element 103-1 in accordance with the flow tables (including any changes implemented at block 423) at block 425. Moreover, operations of blocks 421, 423, and 425 may be repeated as long as the connection between controller 101-1 and forwarding element 103-1 is maintained at block 427.

During the course of processing data packets through forwarding element 103-1 at block 425, one or more data packets may not match any flow entries of flow table(s) 201, in which case, processor 307 may forward the non-matching data packet(s) through channel interface 203 and over OpenFlow channel to controller 101-1. On receipt of the non-matching data packet over the OpenFlow channel and through channel interface 303, processor 307 of controller 101-1 may decide to add or update a flow entry of flow table(s) 201 of forwarding element 103-1 to handle a new data stream including the non-matching data packet. Processor 307 of controller 101-1 may transmit the instruction at block 511, processor 207 of forwarding element 103-1 may receive the instruction at block 421, and processor 207 of forwarding element 103-1 may add/update a flow entry of flow table(s) 201 in accordance with the instruction. Processor 207 of forwarding element 103-1 may then process subsequent data packets of the new data stream in accordance with the added/updated flow entry.

As discussed above, if processor 307 of controller 101-1 accepts the connection request at block 503 and transmits the acceptance message to forwarding element 103-1 at block 507, forwarding element 103-1 and controller 101-1 may proceed with operations 421, 423, 425, and 427 of FIG. 4 and with operations 509, 511, and 515 of FIG. 5. In the alternative, processor 307 of controller 101-1 may reject the connection request at block 503 and transmit a rejection message through channel interface 303 over the OpenFlow channel to forwarding element 103-1 at block 505 of FIG. 5. More particularly, the rejection message may include an address (e.g., an IP address) of a secondary controller (e.g., controller 101-2) or a list of addresses (e.g., IP addresses) of respective secondary controllers (e.g., controllers 101-2, 101-3, 101-4, etc.). The rejection message, for example, may include an address/addresses for one or more secondary controllers that may be more suitable to control forwarding element 103-1. On transmission/reception of the rejection message, the socket connection between forwarding element 103-1 and controller 101-1 may be dropped.

On receipt of the rejection message at block 407 over the OpenFlow channel through channel interface 203, processor 207 of forwarding element 103-1 may transmit a second connection request (through channel interface 203 over the OpenFlow channel) to a secondary controller (e.g., controller 101-2) using the first address from the list of addresses of secondary controllers if a list is provided (or using the only address if only one address is provided) at block 411 of FIG. 4. More particularly, processor 207 may establish a socket connection between channel interface 203 of forwarding element 103-1 and channel interface 303 of secondary controller 101-2 over the OpenFlow channel using the address of controller 101-2, and the second connection request may be transmitted over the socket connection.

The secondary controller (e.g., controller 101-2) may then proceed with operations of FIG. 5 as discussed above with respect to primary controller 101-1. On receipt of the connection request (over the OpenFlow channel through channel interface 303 of secondary controller 101-2) at block 501, processor 307 of secondary controller 101-2 may either accept or reject the connection request at block 503, and either transmit an acceptance message at block 507 or a rejection message at block 505.

If processor 307 of controller 101-2 transmits an acceptance message at block 507 and the acceptance message is received by processor 207 of forwarding element 103-1 at block 415, processor 207 of forwarding element 103-1 may proceed with operations of blocks 421, 423, 425, and 427 and processor 307 of controller 101-2 may proceed with operations of blocks 509, 511, and 515 to provide a connection between forwarding element 103-1 and controller 101-1.

If processor 307 of controller 101-2 transmits a rejection message at block 505, the rejection message may include a secondary controller address or a list of secondary controller addresses to be used by processor 207 of forwarding element 103-1 for subsequent connection requests. In an alternative, a rejection message from a secondary controller may omit addresses of other secondary controllers so that the forwarding element 103-1 continues using secondary controller addresses provided in a list from the first rejection message from primary controller 101-1. Upon transmission of the rejection message at block 505 and/or receipt of the rejection message at block 415, the socket connection between forwarding element 103-1 and controller 101-2 may be dropped.

If a rejection message is received by processor 207 from secondary controller 101-2 over the OpenFlow channel through channel interface 203 at block 415, processor 207 of forwarding element 103-1 may determine if all addresses of secondary controllers have been exhausted at block 417. Processor 207 of forwarding element 103-1 may thus repeat operations of blocks 411, 415, and 417 until either a connection with a secondary controller is established or connection attempts to connect to all identified secondary controllers fail. According to some embodiments, a first rejection message received at block 407 from primary controller 101-1 may include a list of addresses of secondary controllers, and processor 207 of forwarding element 103-1 may proceed through operations of blocks 411, 415, and 417 sequentially using addresses from the list provided with the first rejection message until either a connection request is accepted at block 415 or all of the addresses of the list have been exhausted at block 417. According to some other embodiments, each rejection message received at block 415 may include an address(es) of a secondary controller(s) that is used for a subsequent connection request at block 411.

Figure 6:
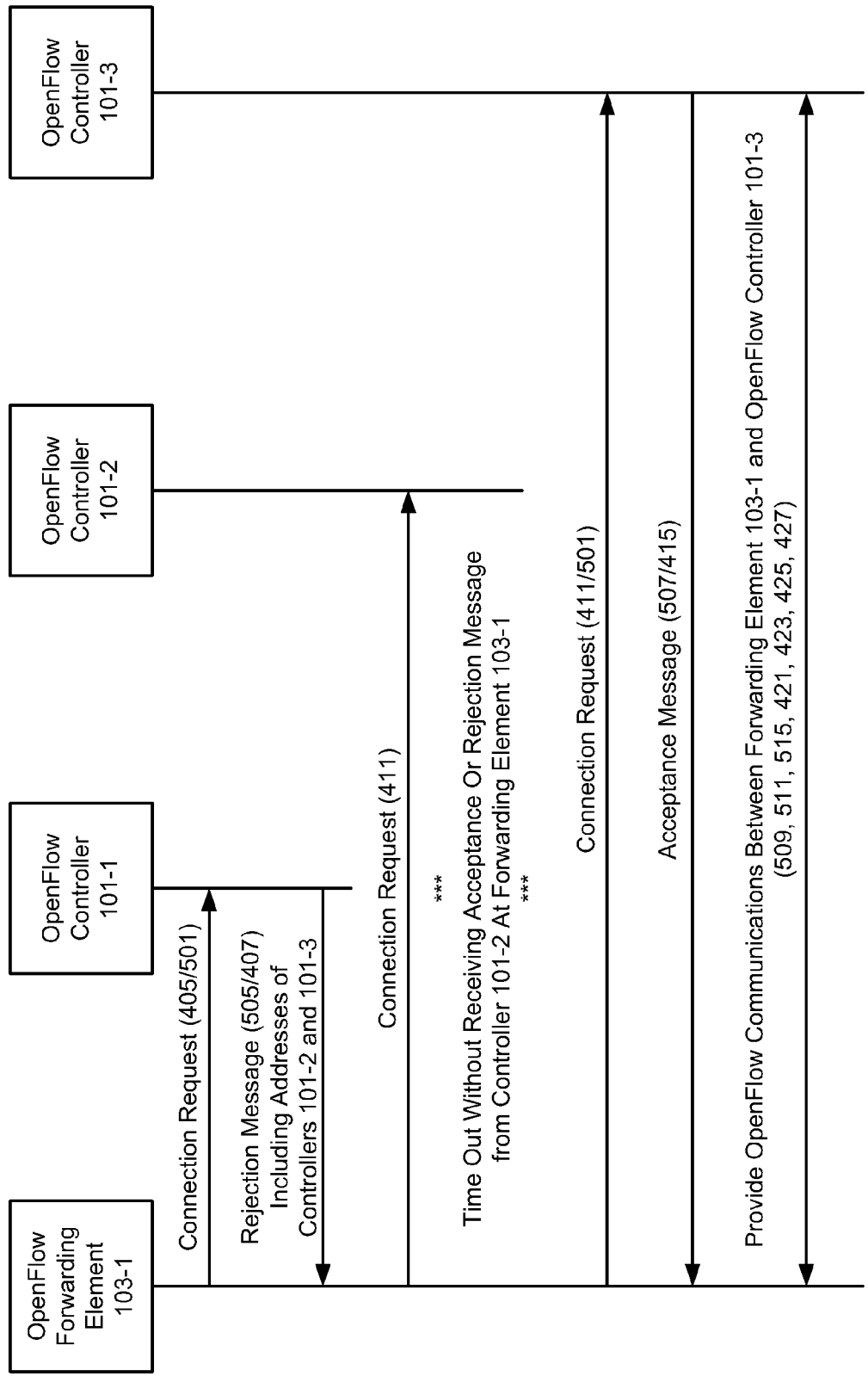
FIG. 6 is a flow diagram illustrating communications between a forwarding element and controllers according to some embodiments.

FIG. 6 is a message flow diagram illustrating an example of communications between forwarding element 101-1 and controllers 101-1, 101-2, and 101-3 over the OpenFlow channel as shown in FIG. 1 according to operations of FIGS. 4 and 5. Forwarding element 103-1 may have the structure illustrated in FIG. 2 and may operate in accordance with operations of the flow chart of FIG. 4. Each of controllers 101-1, 101-2, and 101-3 may separately have the structure of FIG. 3 and may operate independently in accordance with operations of the flow chart of FIG. 5. Moreover, operations from the flow charts of FIGS. 4 and 5 are provided in parenthesis in FIG. 6 to illustrate a correspondence of messages of FIG. 6 and operations of FIGS. 4 and 5.

As shown in FIG. 4, forwarding element 103-1 may transmit a first connection request to controller 101-1 (acting as a primary controller) and the connection request may be received at controller 101-1 as discussed above with respect to operations 405 and 501 of FIGS. 4 and 5. Forwarding element 103-1, for example, may transmit the first connection request responsive to detecting initial connection to the OpenFlow channel or responsive to loss of a previous connection with another controller.

Responsive to receiving the first connection request and rejecting the connection request, controller 101-1 may transmit a rejection message to forwarding element 103-1 and the rejection message may be received at forwarding element 103-1 as discussed above with respect to operations 505 and 407 of FIGS. 4 and 5. Moreover, the rejection message may include addresses of first and second secondary controllers 101-2 and 101-3 to be used by forwarding element 103-1 for subsequent connection requests.

Upon receipt of the rejection message including the addresses of first and second secondary controllers 101-2 and 101-3, forwarding element 103-1 may transmit a second connection request to first secondary controller 101-2 using the first address in the list provided with the rejection message as discussed above with respect to operation 411 of FIG. 4. In this example, first secondary controller 101-2 may be out of service so that the second connection request is not received by the second controller and/or no acceptance or rejection message is transmitted by first secondary controller 101-2. Accordingly, no acceptance or rejection message is received by forwarding element 103-1 at block 415. In this case, failure to receive a response to the second connection request within a designated timeout period may be interpreted as a rejection at block 415 of FIG. 4.

Accordingly, forwarding element 103-1 may transmit a third connection request to second secondary controller 101-3 using the second address in the list provided with the rejection message from controller 101-1 as discussed above with respect to operation 411 of FIG. 4, and the third connection request may be received at the second secondary controller 101-3 as discussed above with respect to operation 501 of FIG. 5.

Responsive to receiving the third connection request and accepting the third connection request, controller 101-3 may transmit an acceptance message to forwarding element 103-1 and the acceptance message may be received at forwarding element 103-1 as discussed above with respect to operations 507 and 415 of FIGS. 4 and 5. OpenFlow communications may then be provide over the OpenFlow channel between forwarding element 103-1 and controller 101-3 as discussed above with respect to operations 509, 511, and 515 of FIG. 5 and operations 421, 423, 425, and 427 of FIG. 4.

The rejection message of operation 505 of FIGS. 5 and 6 (also referred to as a redirection message) may be provided as a new message type, such as an OFPT_CONNECTION_RE-JECT message having the following format:

| REJECTION MESSAGE FORMAT | DEFINITIONS OF MESSAGE ELEMENTS |
|---|---|
| struct ofpt_connection_reject { | message name |
| struct ofpt_header header; | header |
| u_int32_t num_of_controllers; | number of secondary controller addresses |
| u_int32_t ofpt_controller_ip_list[ ]; | list of secondary controller addresses |
| }; | |

The header (struct ofpt_header header) may be an OpenFlow header including the version, type, length, and xid (a unique identification for the message), and a transaction identification. The transaction identification may be required to match a reply from the forwarding element with a request. With a rejection message discussed herein, a transaction identification may not be required because a forwarding element reply may not be received for a rejection message. The "num_of_controllers" field may indicate a number of controller IP addresses included in the rejection message, and the "ofpt_controller_ip_list" provides the list of secondary controller IP addresses.

An initial connection request (e.g., an OFPT_CONNECTION_REJECT message) may be transmitted from forwarding element 103-1 at block 405 of FIG. 4 and received by controller 101-1 at block 501 of FIG. 5, and controller 101-1 may then decide whether to accept the connection request as discussed above with respect to block 503 of FIG. 5. If controller 101-1 decides to accept the connection request, controller 101-1 may respond with an OFPT_FEATURES_REQUEST message as an acceptance message, forwarding element 103-1 may respond with an OFPT_FEATURES_REPLY message, and then a finite state machine (FSM) of controller 101-1 may progress normally to complete the connection between forwarding element 103-1 and controller 101-1.

If controller 101-1 decides to reject a connection request, controller 101-1 may transmit a rejection message as discussed above with respect to operation 505 of FIG. 5. More particularly, the rejection message may be provided as an OFPT_CONNECTION_REJECT message discussed above, with the "ofpt_controller_ip_list" field including a list of one or more IP addresses of secondary controllers (e.g., IP addresses for controllers 101-2, 101-3, 101-4, etc.), with the "num_of_controllers" field set to indicate the number of IP addresses included in the list, and with the message type set to "OFPT_CONNECTION_REJECT." Controller 101-1 may then send the rejection message to forwarding element 101-1 as discussed above with respect to block 505 of FIG. 5 and issue a connection shut down to shut down the socket connection between forwarding element 103-1 and controller 101-1. The forwarding element 103-1 may also close the socket connection, and then use the controller IP addresses from the "ofpt_controller_ip_list" field for subsequent connection attempts in accordance with operations 411, 415, and 417 of FIG. 4. Forwarding element 101-1 may also save the controller IP addresses from the "ofpt_controller_ip_list" field for use in the event that a subsequent connection with a secondary controller is lost.

According to some embodiments, a cluster of controllers 101-1 to 101-n may be provided in the control plane, and one of the controllers (e.g., controller 101-1) may be elected as a master of the cluster. The remaining controllers (e.g., controllers 101-2 to 101-n) may be stand-by or secondary controllers that are ready to take over in the event that master controller 101-1 fails. Accordingly, all forwarding elements 103-1 to 103-m in the forwarding plane may be initially connected to master controller 101-1.

In the event that master controller 101-1 fails, the secondary controllers 101-2 to 101-n may need to elect a new master controller, and all forwarding elements 103-1 to 103-n may need to reconnect with the new master controller. Remaining controllers 101-2 to 101-n may elect a new master (e.g., controller 101-2) based on information obtained/provided over communication paths 115, but forwarding elements 103-1 to 103-m may be unaware of this election. Accordingly, one or more of forwarding elements 103-1 to 103-m may attempt reconnection with the wrong controller.

By way of example, original master controller 101-1 may fail, and the remaining controllers 101-2 to 101-n of the control plane may elect controller 101-2 as the new master controller. Upon failure to receive respective ECHO_REPLY messages from original master controller 101-1 within a timeout period, each of forwarding elements 103-1 to 103-m may attempt to connect with one of the other controllers 101-2 to 101-m without knowing that controller 101-2 has been elected as the new master controller. Accordingly, some of forwarding elements 103-1 to 103-m may connect with one of non-master controllers 101-3 to 101-n. In this situation, the non-master controllers 101-3 to 101-n may use rejection messages (also referred to as redirection messages) to redirect forwarding elements 103-1 to 103-m to the new master controller 101-2.

By way of example, all forwarding elements 103-1 to 103-n may be initially connected to original master controller 101-1 when master controller fails. Upon timeouts after respective failure to receive respective ECHO_REPLY messages from original master controller 101-1, each forwarding element 103-1 to 103-n may attempt to connect with another controller in accordance with operations discussed above with respect to FIG. 4.

Some of the forwarding elements may correctly initiate connection with new master controller 101-2, but others may initiate connection with other controllers. Forwarding element 103-1, for example, may initiate connection with controller 101-3. In this case, forwarding element 103-1 and controller 101-3 may follow operations 401, 403, 405, and 407 of FIG. 4 and operations 501, 503, and 505 of FIG. 5 to redirect forwarding element 103-1 to new master controller 101-2. Stated in other words, controller 101-3 may transmit a rejection message at block 505 of FIG. 5 including an IP address of the new master controller 101-1. Accordingly, forwarding element 103-1 may proceed with operation of 411, 415, and 417 of FIG. 4 to connect with the new master controller 101-2. Similarly, any of controllers 101-3 to 101-n may use a rejection message including the IP address of the new master controller 101-2 to efficiently redirect forwarding elements to the new master controller.

According to other embodiments, no one controller may be designated as a mater controller, and instead, all controllers 101-1 to 101-n in the control plane may be peer controllers, with each forwarding element being connected to one of the peer controllers. Accordingly, peer controllers 101-1 to 101-n may share the load of forwarding elements 103-1 to 103-m. Moreover, controllers 101-1 to 101-n may share data/state information over communication paths 115.

When one of the forwarding elements (e.g., forwarding element 103-1) attempts connection with one of the controllers (e.g., controller 101-1), the controller may determine whether to accept or reject the connection request based on its load and/or based on loads of other controllers. If the controller determines that the connection with the forwarding element is best handled by another controller (e.g., because its load is relatively high and/or because a load of another controller is relatively low), the controller may transmit a rejection message including an IP address of another controller (e.g., another controller that is currently experiencing a lower load). Rejection messages may thus be used to share forwarding element loads across controllers of the control plane.

According to embodiments discussed above, a plurality of controllers may be deployed in the control plane, and rejection messages may be used to control/redirect connections between forwarding elements of the forwarding plane and controllers of the control plane. Moreover, new forwarding elements and/or controllers may be deployed in the forwarding and control planes while maintaining network operations without requiring an elaborate configuration protocol. In addition, rejection messages may be used to manage maintenance of the network.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of connecting a network forwarding element, the method comprising:
    transmitting a first connection request from the forwarding element to a first network controller;
    after transmitting the first connection request, receiving a rejection message from the first network controller at the network forwarding element, wherein the rejection message is responsive to the first connection request and wherein the rejection message includes an address of a second network controller; and
    responsive to receiving the rejection message, transmitting a second connection request from the network forwarding element to the second network controller; wherein the address of the second network controller is programmed during manufacture of the interface of the second network controller, is a default controller address or is an Internet Protocol (IP) address.

2. The method of claim 1 wherein the rejection message includes the address of the second network controller and an address of a third network controller.

3. The method of claim 1 wherein the first and second network controllers comprise respective first and second OpenFlow network controllers, wherein the network forwarding element comprises an OpenFlow network forwarding element, and wherein the rejection message is transmitted over an OpenFlow channel.

4. The method of claim 1 wherein the network forwarding element comprises a flow table including a plurality of flow entries with each of the plurality of flow entries defining processing for data packets of a respective data stream, the method further comprising:
    after transmitting the second connection request, receiving an acceptance message from the second network controller at the network forwarding element; and
    after receiving the acceptance message, receiving an instruction to change at least one of the plurality of flow entries from the second network controller at the network forwarding element; and
    changing the at least one of the plurality of flow entries responsive to the instruction received from the second network controller.

5. The method of claim 4 further comprising:
    after changing the at least one of the plurality of flow entries, processing a data packet of a data stream through the network forwarding element in accordance with the at least one of the plurality of flow entries including the change.

6. The method of claim 1 wherein the rejection message includes the address of the second network controller and an address of a third network controller, the method further comprising:
    responsive to transmitting the second connection request without establishing a connection with the second network controller, transmitting a third connection request from the network forwarding element to the third network controller.

7. The method of claim 6 wherein the network forwarding element comprises a flow table including a plurality of flow entries with each of the plurality of flow entries defining processing for data packets of a respective data stream, the method further comprising:
    after transmitting the third connection request, receiving an acceptance message from the third network controller at the network forwarding element;
    after receiving the acceptance message, receiving an instruction to change at least one of the plurality of flow entries from the third network controller at the network forwarding element; and
    changing the at least one of the plurality of flow entries responsive to the instruction received from the third network controller.

8. A method of redirecting a network forwarding element, the method comprising:
    receiving a connection request at a first network controller from the network forwarding element;
    responsive to receiving the connection request, determining whether to accept control of the forwarding element at the first network controller; and
    responsive to determining to not accept control of the forwarding element at the first network controller, transmitting a rejection message from the first network controller to the network forwarding element, wherein the rejection message includes an address of a second network controller; wherein the address of the second network controller is programmed during manufacture of the interface of the second network controller, is a default controller address or is an Internet Protocol (IP) address.

9. The method of claim 8 wherein the rejection message includes the address of the second network controller and an address of a third network controller.

10. The method of claim 8 wherein the first and second network controllers comprise respective first and second OpenFlow network controllers, wherein the network forwarding element comprises an OpenFlow network forwarding element, and wherein the rejection message is transmitted over an OpenFlow channel.

11. The method of claim 8 wherein the network forwarding element comprises a flow table including a plurality of flow entries with each of the plurality of flow entries defining processing for data packets of a respective data stream, the method further comprising:
    responsive to determining to accept control of the forwarding element at the first network controller, transmitting an acceptance message from the first network controller to the network forwarding element; and
    after transmitting the acceptance message, transmitting an instruction to change at least one of the plurality of flow entries from the first network controller to the network forwarding element.

12. A network forwarding element comprising:
- a channel interface configured to provide communications between the network forwarding element in a forwarding plane and a control plane including a plurality of controllers; and
- a processor coupled to the channel interface, wherein the processor is configured to transmit a first connection request through the channel interface to a first network controller of the control plane, to receive a rejection message from the first network controller through the channel interface after transmitting the first connection request wherein the rejection message is responsive to the first connection request and wherein the rejection message includes an address of a second network controller of the control plane, and to transmit a second connection request from the network forwarding element to the second network controller responsive to receiving the rejection message; wherein the address of the second network controller is programmed during manufacture of the interface of the second network controller, is a default controller address or is an Internet Protocol (IP) address.

13. The network forwarding element of claim 12 wherein the rejection message includes the address of the second network controller and an address of a third network controller.

14. The network forwarding element of claim 12 wherein the first and second network controllers comprise respective first and second OpenFlow network controllers, wherein the network forwarding element comprises an OpenFlow network forwarding element, wherein the channel interface comprises an OpenFlow secure channel interface, and wherein the rejection message is transmitted over an OpenFlow channel.

15. The network forwarding element of claim 12 further comprising:
- a plurality of input ports configured to receive data packets of data streams from other forwarding elements;
- a plurality of output ports configured to transmit the data packets of the data streams to other forwarding elements, wherein the processor is coupled between the input and output ports; and
- a flow table coupled to the processor, wherein the flow table includes a plurality of flow entries with each of the plurality of flow entries defining processing for data packets of a respective data stream between respective ones of the input and output ports, between a respective one of the input ports and the control plane, and/or between the control plane and a respective one of the output ports;
- wherein the processor is further configured to receive an acceptance message from the second network controller through the channel interface after transmitting the second connection request, to receive an instruction to change at least one of the plurality of flow entries from the second network controller through the channel interface after receiving the acceptance message, and to change the at least one of the plurality of flow entries of the flow table responsive to the instruction received from the second network controller.

16. The network forwarding element of claim 15 wherein the processor is further configured to process a data packet of a data stream between respective ones of the input and output ports, between respective ones of the input ports and the control plane, and/or between the control plane and respective ones of the output ports in accordance with the at least one of the plurality of flow entries including the change.

17. The network forwarding element of claim 12 wherein the rejection message includes the address of the second network controller and an address of a third network controller, wherein the processor is further configured to transmit a third connection request through the channel interface to the third network controller responsive to transmitting the second connection request without establishing a connection with the second network controller.

18. The network forwarding element of claim 17 further comprising:
- a plurality of input ports configured to receive data packets of data streams from other forwarding elements;
- a plurality of output ports configured to transmit the data packets of the data streams to other forwarding elements, wherein the processor is coupled between the input and output ports; and
- a flow table coupled to the processor, wherein the flow table includes a plurality of flow entries with each of the plurality of flow entries defining processing for data packets of a respective data stream between respective ones of the input and output ports, between a respective one of the input ports and the control plane, and/or between the control plane and a respective one of the output ports;
- wherein the processor is further configured to receive an acceptance message from the third network controller through the channel interface after transmitting the third connection request, to receive an instruction to change at least one of the plurality of flow entries from the third network controller through the channel interface after receiving the acceptance message, and to change the at least one of the plurality of flow entries responsive to the instruction received from the third network controller.

19. A network controller comprising:
- a channel interface configured to provide communications between the network controller in a control plane and a forwarding plane including a plurality of network forwarding element; and
- a processor coupled to the channel interface, wherein the processor is configured to receive a connection request through the channel interface from the network forwarding element, to determine whether to accept control of the forwarding element at the first network controller responsive to receiving the connection request, and to transmit a rejection message through the channel interface to the network forwarding element responsive to determining to not accept control of the forwarding element, wherein the rejection message includes an address of a second network controller; wherein the address of the second network controller is programmed during manufacture of the interface of the second network controller, is a default controller address or is an Internet Protocol (IP) address.

20. The network controller of claim 19 wherein the rejection message includes the address of the second network controller and an address of a third network controller.

21. The network controller of claim 19 wherein the first and second network controllers comprise respective first and second OpenFlow network controllers, wherein the network forwarding element comprises an OpenFlow network forwarding element, wherein the channel interface comprises an OpenFlow secure channel interface, and wherein the rejection message is transmitted over an OpenFlow channel.

22. The network controller of claim 19 wherein the network forwarding element comprises a flow table including a plurality of flow entries with each of the plurality of flow entries defining processing for data packets of a respective data stream, and wherein the processor is further configured to transmit an acceptance message through the channel interface to the network forwarding element responsive to determining to accept control of the forwarding element, and to transmit an instruction to change at least one of the plurality of flow entries through the channel interface to the network forwarding element after transmitting the acceptance message.

* * * * *

UNITED STATES PATENT AND TRADEMARK OFFICE
CERTIFICATE OF CORRECTION

PATENT NO. : 9,130,869 B2  
APPLICATION NO. : 13/369993  
DATED : September 8, 2015  
INVENTOR(S) : Manghirmalani et al.

Page 1 of 1

It is certified that error appears in the above-identified patent and that said Letters Patent is hereby corrected as shown below:

In the Specification

In Column 1, Lines 46-47, delete "(allowing" and insert -- allowing --, therefor.

In Column 12, Line 6, delete "forwarding element 101-1" and insert -- forwarding element 103-1 --, therefor.

In Column 13, Line 26, delete ""num_of" and insert -- "num_of_ --, therefor.

Signed and Sealed this  
Fifth Day of July, 2016

Michelle K. Lee  
*Director of the United States Patent and Trademark Office*